April 12, 1966 B. J. MATSON ET AL 3,245,317
READY SERVICE RING MECHANISM WITH SUPPORTING TRUSS STRUCTURE
Filed Aug. 28, 1962 13 Sheets-Sheet 1

FIG. 1

INVENTORS
BERTRAM J. MATSON
PALMER G. WERMAGER
MARTIN J. CLUNE
BY Claude Funkhouser
ATTORNEY

April 12, 1966 B. J. MATSON ETAL 3,245,317
READY SERVICE RING MECHANISM WITH SUPPORTING TRUSS STRUCTURE
Filed Aug. 28, 1962 13 Sheets-Sheet 6

United States Patent Office 3,245,317
Patented Apr. 12, 1966

3,245,317
READY SERVICE RING MECHANISM WITH SUPPORTING TRUSS STRUCTURE
Bertram J. Matson, Minneapolis, and Palmer G. Wermager, Robbinsdale, Minn., and Martin J. Clune, Hyattsville, Md., assignors, by mesne assignments, to United States of America as represented by the Secretary of the Navy
Filed Aug. 28, 1962, Ser. No. 220,107
2 Claims. (Cl. 89—1.7)

This invention relates generally to armament mechanisms, and more particularly it pertains to a mechanism for storing and dispensing selected ones of a store of missile-booster weapons.

The capability for rapid firing of missile-booster weapons is an essential quality of modern armament. Missile type booster weapons can no longer be manually handled with rapidity because of their great size and weight.

It is an object of the present invention, therefore, to provide a mechanism for storing an assortment of generally similar missile-booster weapons which automatically and quickly extends a selected one of the weapons and delivers it to an overhead conveyor trunk.

Another object of this invention is to provide a missile-booster weapon storage and dispensing mechanism which is especially compact and space saving.

And another object of this invention is to provide a mechanism which safely and securely cradles missile-booster weapons stored therein and automatically positions, releases and hoists a selected one.

Another object of this invention is to provide an indexing ring drive for rotating a missile-booster weapon storage ring.

Another object of this invention is to provide a cooperating hoist and tray arrangement which efficiently removes and hoists a missile-booster weapon from a store system.

Yet another object of this invention is to provide a double hoist arrangement that is stowed within an indexing object storage ring and which is extendable at one index station.

Still another object of this invention is to provide a truss structure of exceptional strength and rigidity which simultaneously serves as a supporting framework for a ring magazine and furnished housing for drive and hoisting mechanism associated with the selection and removal of stored missile-booster weapons.

To provide a tray shifting mechanism for disengaging a missile-booster weapon tray from a retaining ring of a ready service ring mechanism and releasing the weapon is another object of the present invention.

And yet another object of this invention is to provide parallel ready service rings each having a hoist station displaced from its center line so that when thus used in right and left hand pairs best utilize the joint space under restricted space conditions.

Other objects, advantages and novel features of the invention will become apparent from the following detailed description of the invention when considered in conjunction with the accompanying drawings wherein:

Figure 1:
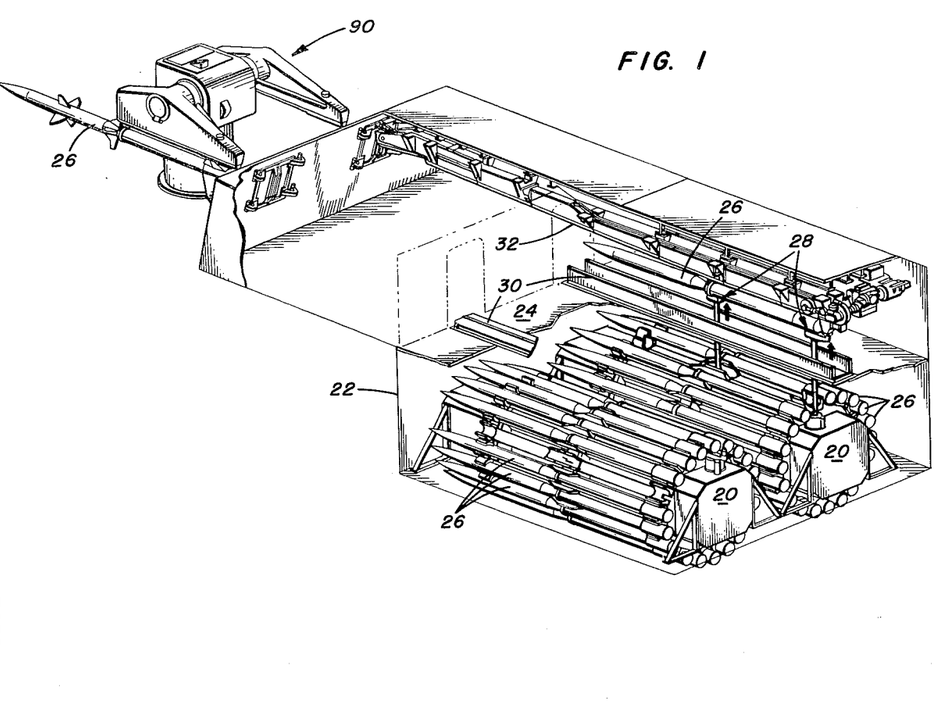
FIG. 1 is a diametric view of a missile launching system broken away, and with one conveyor trunk removed for clarity, showing one of the ready service rings incorporating features of this invention in the automatic unload condition.

Referring now to the details of the drawings, FIG. 1 shows a typical ship board arrangement for utilizing the ready service rings 20 which incorporate features of this invention.

Figure 2:
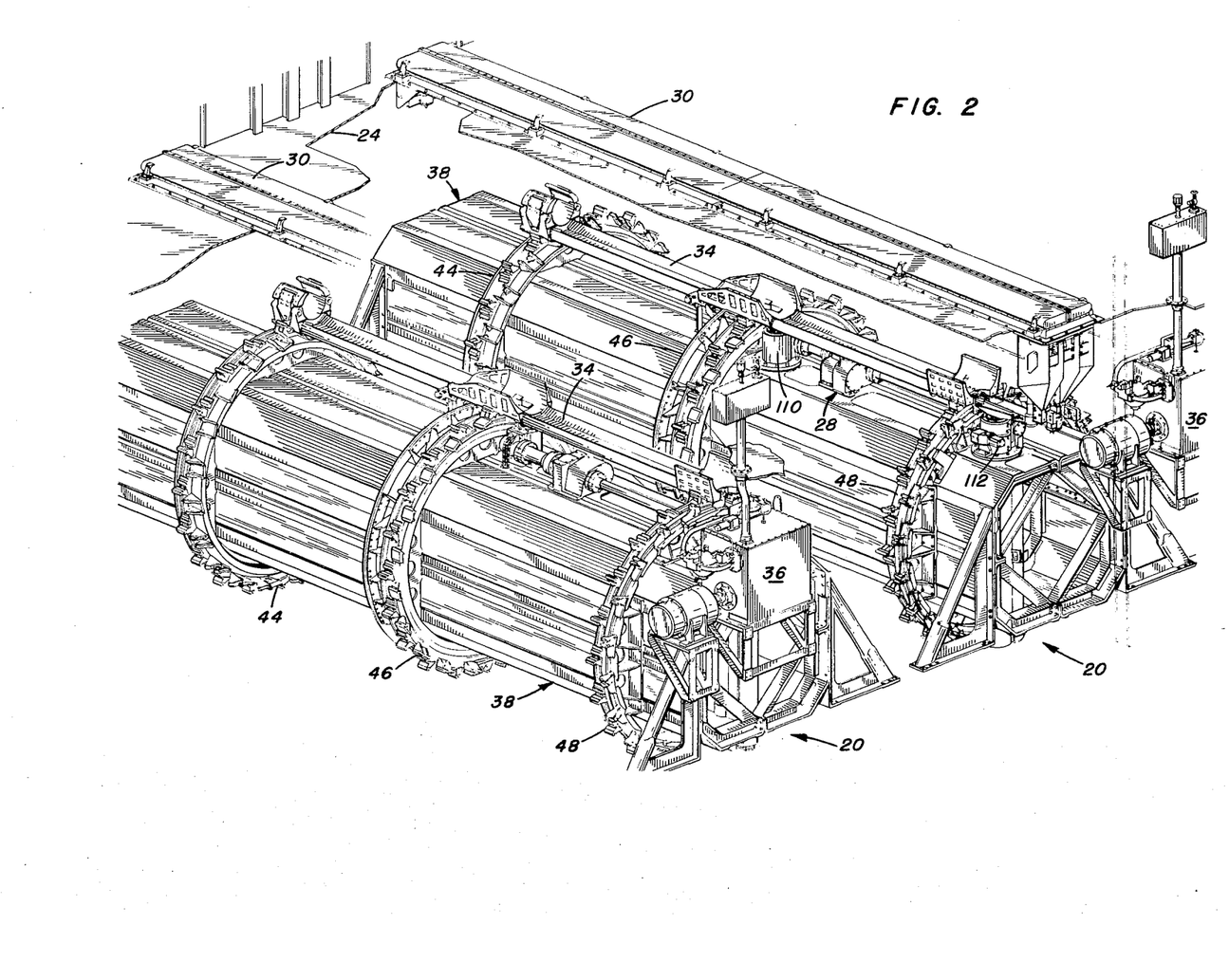
FIG. 2 is an enlarged diametric view, partly broken away, of the missile weapon magazine of the launching system illustrated in FIG. 1.

A pair of these ready service rings 20 are located side by side in a magazine area 22 below the main deck 24 of a guided missile vessel. A plurality of missile-boosters 26 are mounted around each ready service ring 20 and are arranged to be rotated therearound. Each of the ready service rings 20 is provided with a built-in hoist system 28 which extends a pair of telescopic shoe hoists 110 and 112, shown in FIG. 2, to remove and lift a selected one of these missile-booster combinations 26 through magazine doors 30 in the deck 24 to an overhead conveyor trunk 32 for delivery to a missile launcher 90.

Figures 5, 6:
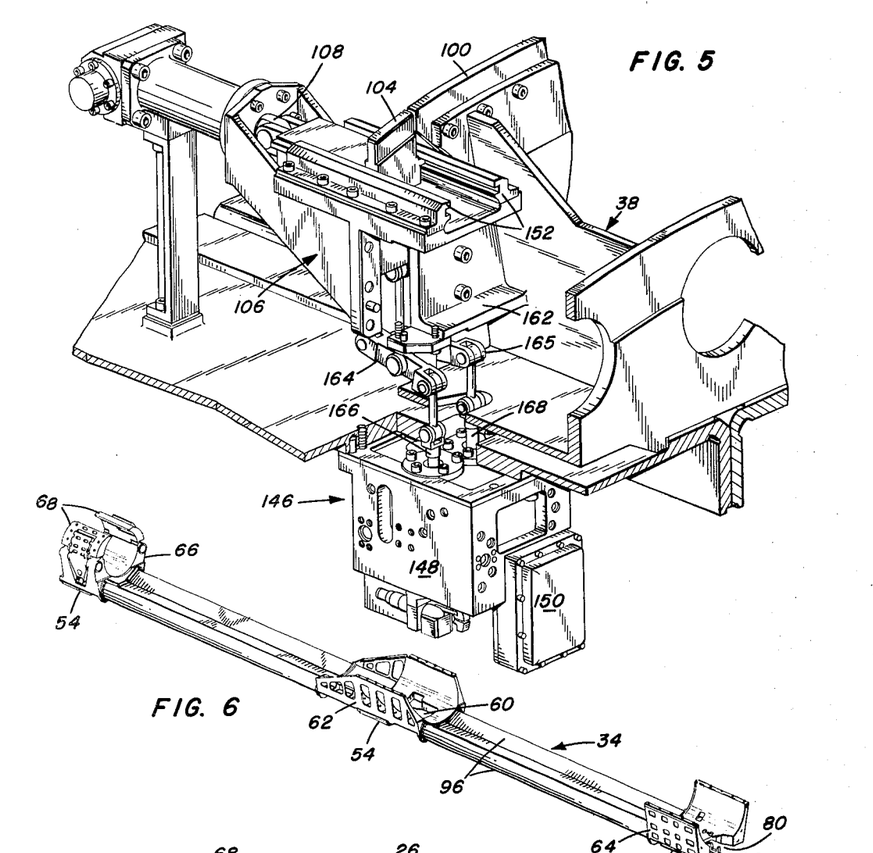
FIG. 5 is a diametric view of a tray shift mechanism.
FIG. 6 is a diametric view of a tray assembly.
Figure 7:
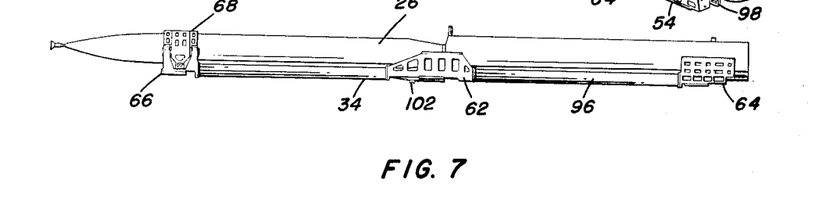
FIG. 7 is a side elevation of a tray assembly having a missile-booster combination positioned therein.

The missile-booster combinations 26 are each retained and handled in a tray 34 as shown in FIGS. 6 and 7. For clarity, only one tray 34 is shown on each ready service ring 20 in FIG. 2. A hydraulic accumulator 36 powers the ready service ring 20 for shifting these trays 34 and indexing them in either direction around a central hollow frame or truss 38 and for powering the hoist system 28.

Figure 3:
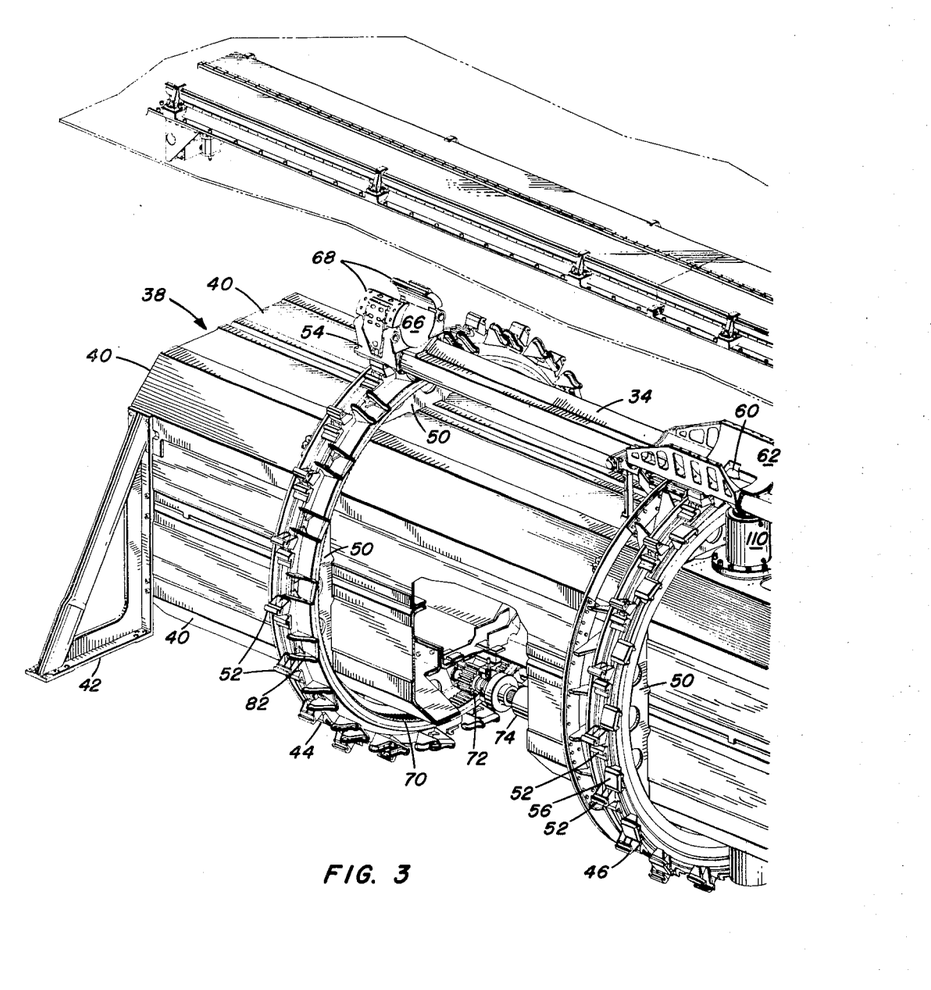
FIG. 3 is a partial view of one ready service ring and its associated magazine doors.
Figure 4:
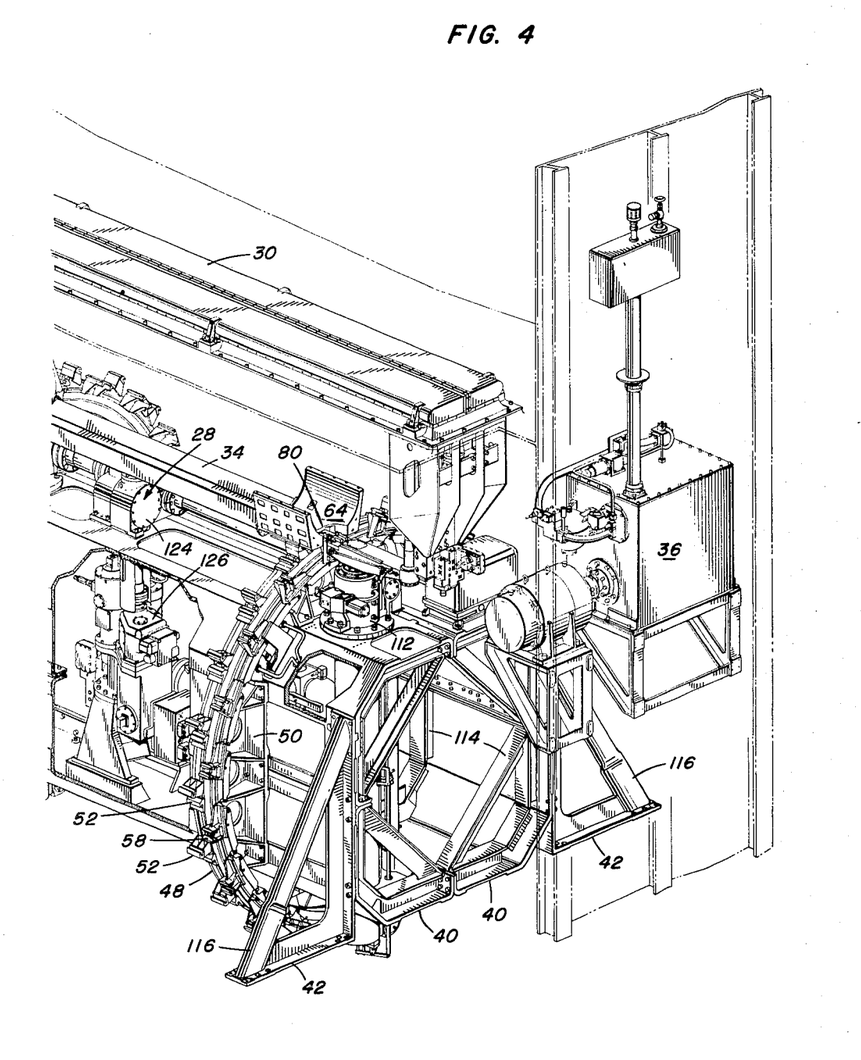
FIG. 4 is a continuation to the right of FIG. 3 and shows the accumulator system associated therewith.

The truss 38 is formed by four long quadrant weldments 40 bolted together as shown in FIGS. 3 and 4. Each quadrant weldment 40 is provided with reinforcing struts 114 on the inside. The truss 38 is supported and secured in place at each end by two large right angle brackets 42 braced with tubular struts 116. The truss 38 and angle brackets 42 are supported by the ship's structure in a manner whereby angle brackets 42 provide lateral support for the upper portion of the truss 38.

Three spaced bearing assemblies 44, 46 and 48 are mounted on the truss 38. The inner stationary portion of the bearing assemblies 44, 46 and 48 is secured to the truss 38 by semicircular steel brackets 50. The outer rotating portion of the bearing assemblies 44, 46, and 48 have a plurality of pairs of slide blocks 52 which mate with slides 54 on the missile-booster trays 34 and retain them on the ready service ring 20. The right and left halves of the slide blocks 52 are of unequal height and shape because of the line of missile-booster weapon transfer is intentionally displaced twelve inches from the vertical center line of the ready service ring 20 and hence the trays 34 cannot be located tangential to the circumference of the bearing assemblies 44, 46, and 48.

A forward booster shoe bracket 56 is mounted between each pair of tray slide blocks 52 on the center bearing assembly 46 and an aft booster shoe bracket 58 is similarly mounted on the aft bearing assembly 48. The booster shoes of the missile-booster combination 26 extend through cutouts 60 and 80 in the center and aft tray saddles 62 and 64, respectively, of the tray 34 to engage these brackets 56 and 58 and retain the missile-booster combination 26 in the tray 34 on the ready service ring 20.

The rotating portion of the forward bearing assembly 44 is provided with cam brackets 82 mounted between the tray slide blocks 52. During fore and aft shifting of a tray 34, an operating cam (not shown) of a forward saddle 66 is actuated by the cam bracket 82 to close or open its forward saddle clamp 68.

Figure 8:
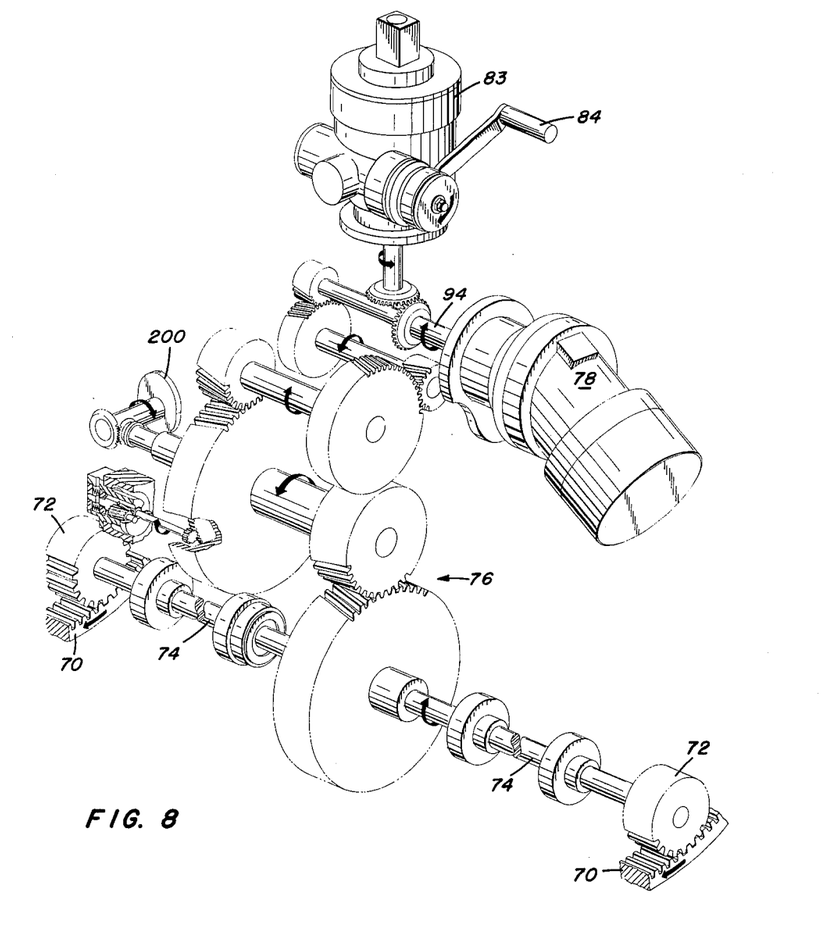
FIG. 8 is a schematic diagram of a ready service ring drive mechanism.

The rotating portion of each of the end bearing assemblies 44 and 48 includes an involute ring gear 70 driven by a stationary pinion gear 72, shown best in FIG. 3. The two pinion gears 72 are connected by coupling drive shafts 74 below the truss 38 to a 600 to 1 ratio gear reduction assembly 76 shown in detail in FIG. 8. It is to be understood that the 600 to 1 ratio gear reduction includes the association with ring gear 70. The gear reduction assembly 76 when considered exclusive of ring gear 70 provides a direct reduction of 37½ to 1. The 600 to 1 ratio thus results from the conjunction of the gear reduction assembly 76 with the 16 to 1 reduction resulting from the action of pinion 72 and ring gear 70.

The gear reduction assembly 76 is mounted inside the truss 38 between the center and aft bearing assemblies 46 and 48 and is driven by a B-end unit 78 mounted on an input shaft 94 on the aft side. A power-off brake 83 having a hand crank 84 for manual rotation of the ready service ring 20 is mounted on the top of the gear reduction assembly 76. A control valve block, not shown, with solenoid operated valves and a drive control unit, is mounted on the forward side.

Figure 11:
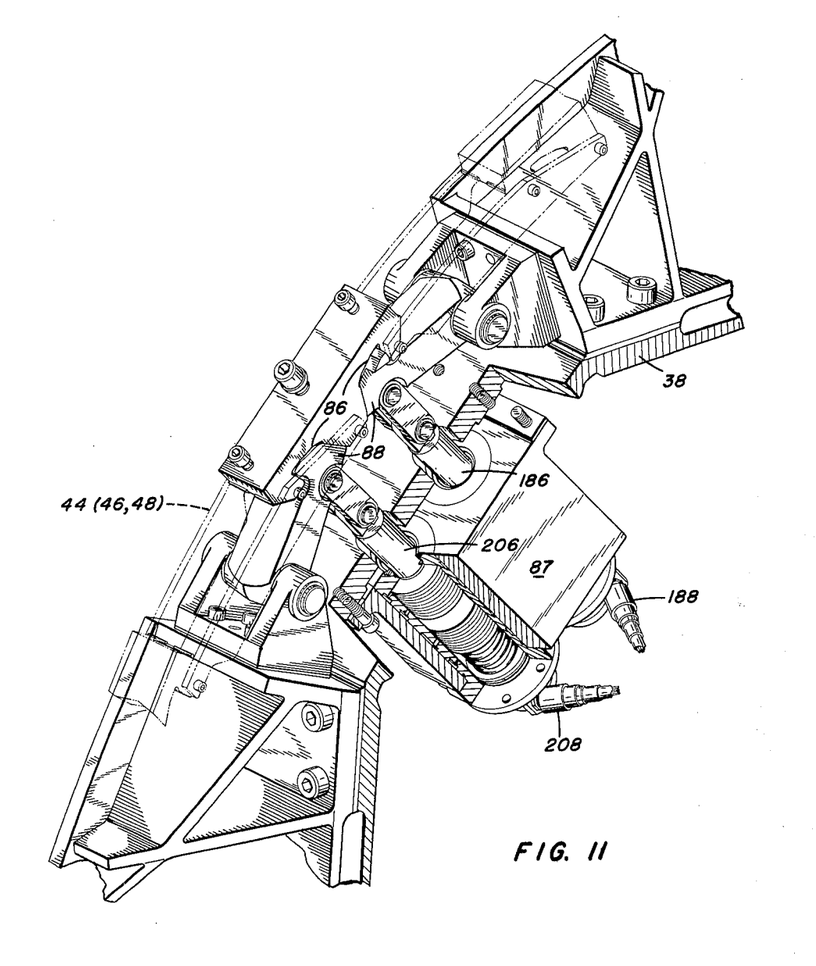
FIG. 11 is a detail view of the positioning latch assembly.

As shown in FIG. 11 the rotating portion of each bearing assembly 44, 46, and 48 is provided with a pair of index notches 85 corresponding to each tray position of the ready service ring 20. Indexing of rotation may be clockwise or counterclockwise to bring any desired tray 34 into hoist position or station 1. Hydraulically actuated index latches 88 mounted in the truss 38 at each bearing assembly 44, 46, and 48 engage the index notches 86 and lock the ready service ring 20 in the indexed position.

As previously mentioned, the hoist transfer (station 1) is twelve inches past top center and in the direction of the centerline of the vessel on both ready service rings 20. That is to say the pairs of ready service rings 20 are constructed and assembled as right and left units in this respect only. As a result, the conveyor trunks 32 can be mounted closer together than the ready service rings 20 to match the width of the missile weapon launcher 90 and to better conserve space.

As shown best in FIGS. 6 and 7, the missile-booster trays 34 of each ready service ring 20 consist of a center, aft and forward saddle 62, 64, and 66, respectively, bolted together with two interconnecting tubular members 96 to form a rigid structure for handling and supporting the long missile-booster combinations 26. The center and aft saddles 62 and 64 support the booster portion of the missile-booster combination 26 at the forward and aft supporting shoe areas.

A hard spot near the warhead of the missile portion of the missile-booster combination is the support point in the forward saddle 66 and is engaged by clamp 68. The aft saddle 64 is provided with a hook 98 bolted to the bottom thereof which engages the aft booster shoe of the booster. The hook 98 and the clamp 68 cooperate to prevent movement of the missile-booster combination 26 relative to the tray 34.

Each tray saddle 62, 64, and 66 is provided with a pair of slides 54 mounted on the bottom edges thereof. The engagement of the tray slides 54 with the bearing assembly slide blocks 52 retains the tray on the ready service ring 20 but permits longitudinal movement thereof.

The center tray saddle 62 is provided with a transversely recessed vertical saddle projection 102 which is cast on the bottom thereof as shown in FIG. 7. A stationary ring 100, best shown in FIG. 5, is mounted on the truss 38 slightly forward of the center bearing assembly 46 and it engages the vertical saddle projection 102 and prevents longitudinal movement of the trays 34 at all index stations except station 1, the hoist station. At station 1, a slidable segment 104 of the ring 100 is movably arranged to permit a tray shift assembly 106 to slide the tray 34.

This tray shift assembly 106 is mounted on the truss 38 at station 1 and is hydraulically operated. Extension of an operating piston 108 shown best in FIG. 5 moves the segment 104 and the engaged tray 34 shifts to shoe hoists 110 and 112, shown in FIG. 9, of the hoist system 28.

When the tray 34 shifts to this hoisting position, the booster shoes of the missile-booster combination 26 in the tray 34 are disengaged from the bearing assembly booster shoe brackets 56 and 58 and are engaged on the forward and aft shoe hoists 110 and 112, respectively. When the tray 34 shifts to ready service, the booster shoes are disengaged from the shoe hoists 110 and 112 and are engaged to the bearing assembly forward and aft shoe brackets 56 and 58.

Figure 9:
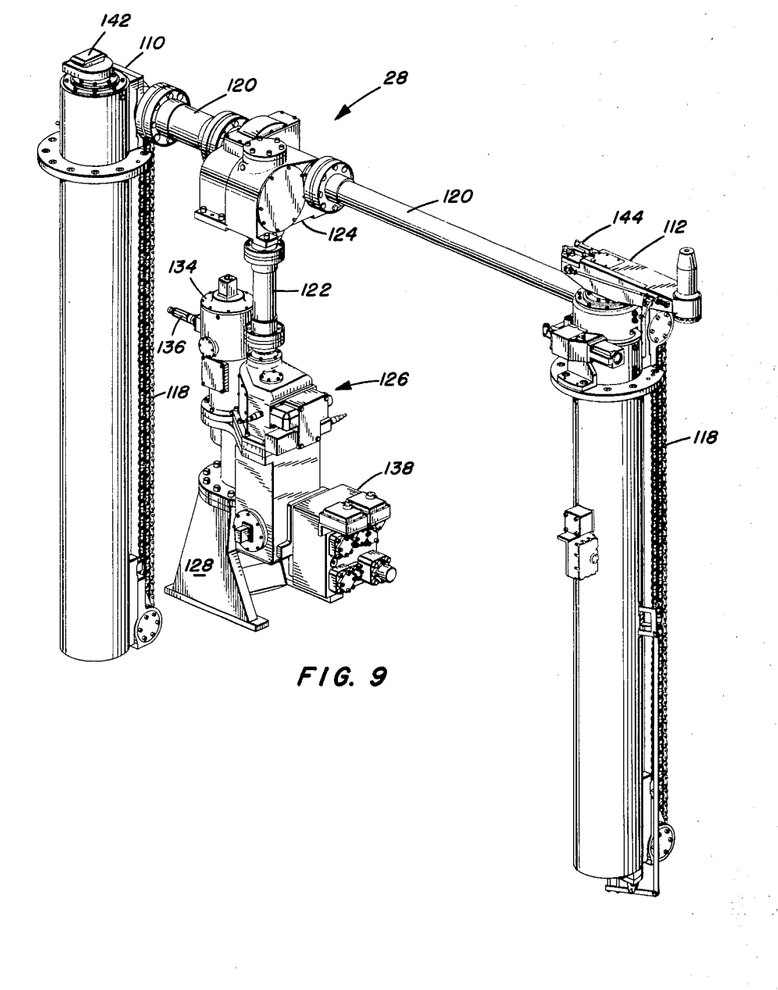
FIG. 9 is a diametric view of a hoist mechanism for the ready service ring.
Figure 10:
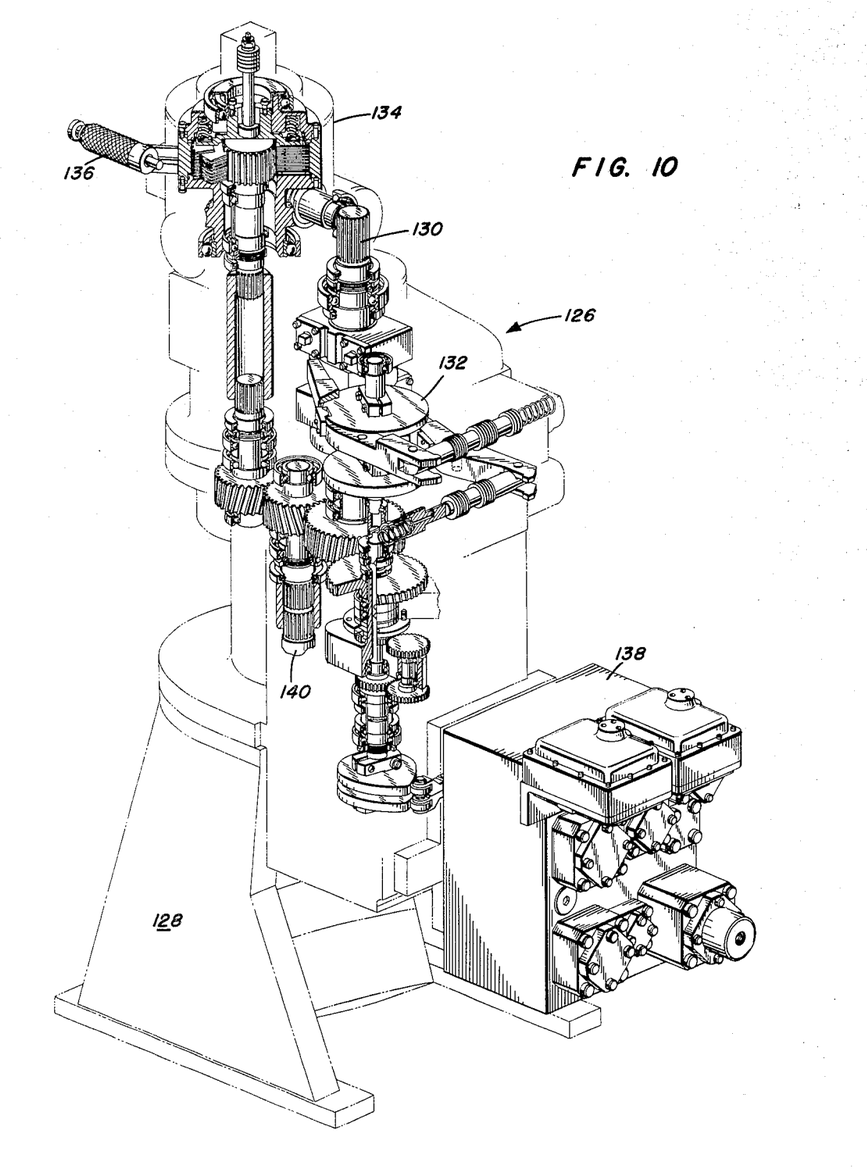
FIG. 10 is a diametric view, with parts removed, of the hoist lower drive.

The hoist system 28 shown in FIGS. 4 and 9 is mounted vertically in the ready service ring truss 38 below station 1. The forward and aft shoe hoist 110 and 112 includes telescopic steel tubing which is moved by dual chains 118 sprocket driven by horizontal drive shafts 120. As shown in FIG. 9, intermediate drive shaft 122 extends downwardly from an upper transmission 124 which turns the shafts 120, to a hoist lower drive unit 126 mounted on a pedestal 128 located inside the truss 38. The lower end of the intermediate drive shaft 122 connects to a splined shaft 130 of the lower drive 126 as depicted best in FIG. 10.

The hoist lower drive 126 includes a latch assembly 132 which holds the forward and aft shoe hoists 110 and 112 in a lowered position or one of two raised positions. A power off brake 134 with a handcrank 136 for manual operation of the hoist system 28 is mounted on top of the hoist lower drive 126 and a hydraulic control unit 138 is secured to one side. The lower drive is powered from a B-end unit inside of the pedestal 128, and it is connected to a vertical input shaft 140.

The top of the forward shoe hoist 110 is provided with a steel block 142, FIG. 9, which is machined to engage the forward booster shoe of the missile-booster combination 26 which is comparable to the forward booster shoe bracket 56 on the center bearing assembly 46 previously described. The aft shoe hoist 112 is provided with a machined steel head 144 shaped to engage the aft shoe.

Figures 13, 13A:
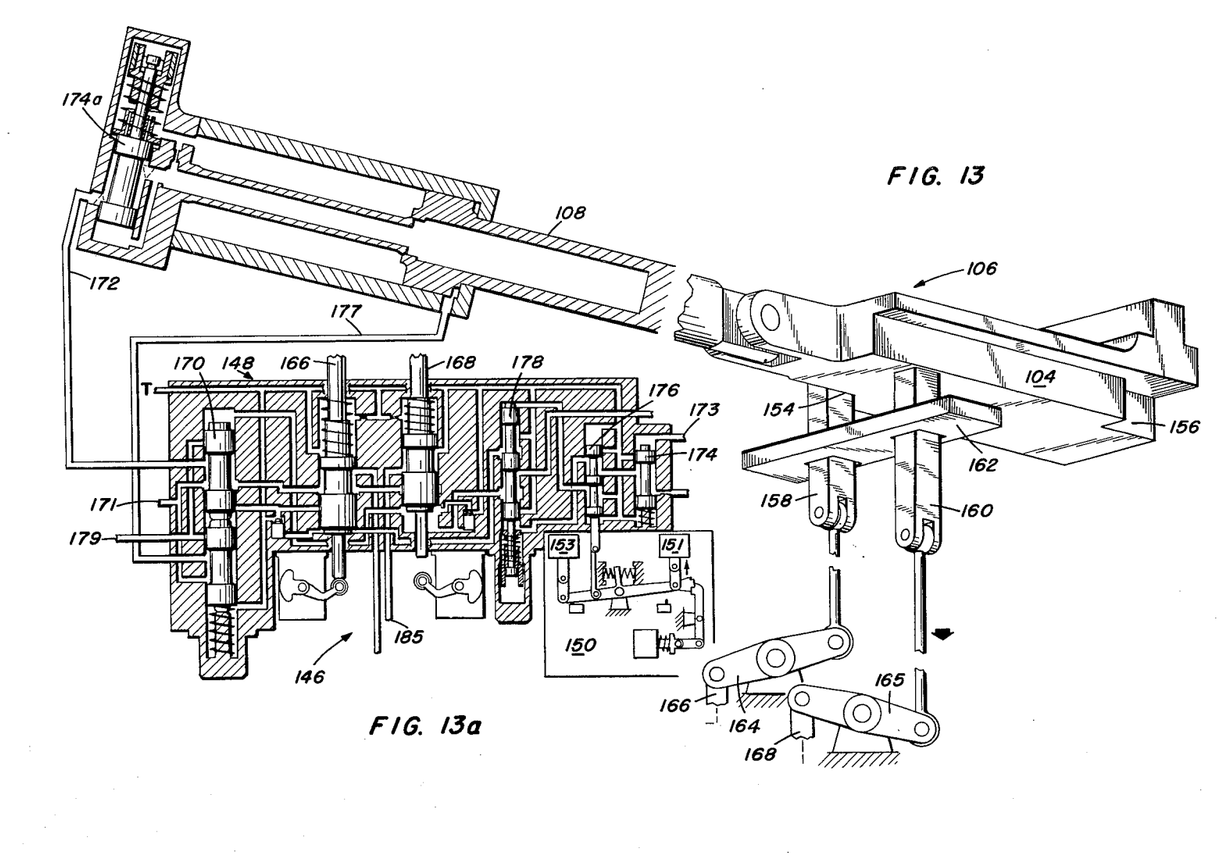
FIG. 13 is a hydraulic schematic of the tray shift control in the tray-to-hoist position.
FIG. 13A is a continuation of FIG. 13 in a downwardly direction.

As shown in FIGS. 5, 13, and 13A the tray shift assembly 106 as a tray shift control 146 mounted directly below it which consists of a value block 148 and a detented solenoid assembly 150. The protruding end of the piston 108 is hinged to the slide segment 104 which travels in a pair of tracks 152. It is the slide segment 104 which does the actual shifting of the tray 34.

The slide segment 104 is provided with two cutouts 154 and 156 for receiving extend and retract latch plungers 158 and 160, respectively. These plungers 158 and 160 are located in a fixed bracket 162. Plungers 158 and 160 are connected to links 164 and 165, respectively, which pivot on the fixed bracket 162. The links 164 and 165, in turn, are connected to operating valves 166 and 168, respectively, in the valve block 148.

A selector valve 170 is provided in the valve block 148 and it is connected by fluid conduits 172 to the tray shift piston 108 and to an interlock valve 174 which is associated therewith.

To extend the tray to the hoist position, solenoid 151 is actuated which moves solenoid valve 176 downward. When the ready service ring 20 is latched and the hoist system 28 is secured in its lowered position, the interlock valve 174 moves downwardly and permits pressurized hydraulic fluid to move into a solenoid valve 176 in its downward position and thence to a pilot valve 178, shifting it upwardly. Accumulator pressure, commonly called PA, can then enter the conduit directly above conduit 173 to the latch operating valve 168 moving it upwardly also.

This action pushes the rocker arm type links 164 associated with the retract latch plunger 160 and moves the latter downwardly in the direction of the arrow, causing the slide segment 104 to be unlatched at cutout 156. Pressure fluid is then transmitted to the selector valve 170, which is then shifted downwardly. Accumulator pressure is then ported through conduit 171, between the bands of valve 170 and through fluid conduits 172 and 177 to both sides of the piston 108, which being of a differential area type, moves to extend the tray 34 to the hoist position.

Figures 14, 14A:
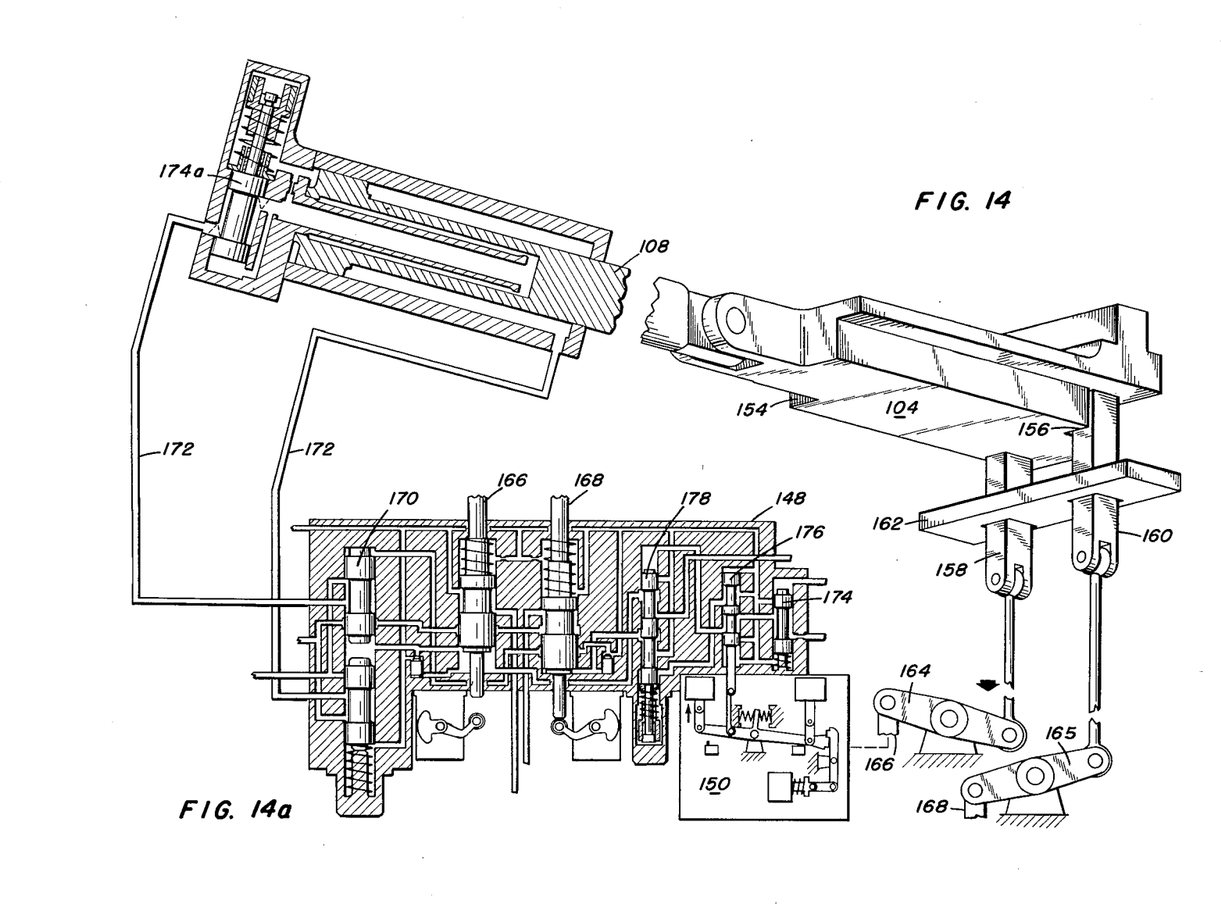
FIG. 14 is a view similar to FIG. 13 in which the tray shift control is shown in the tray-to-ready service ring position.
FIG. 14A is a continuation of FIG. 14 in a downwardly direction.
Figures 15, 16:
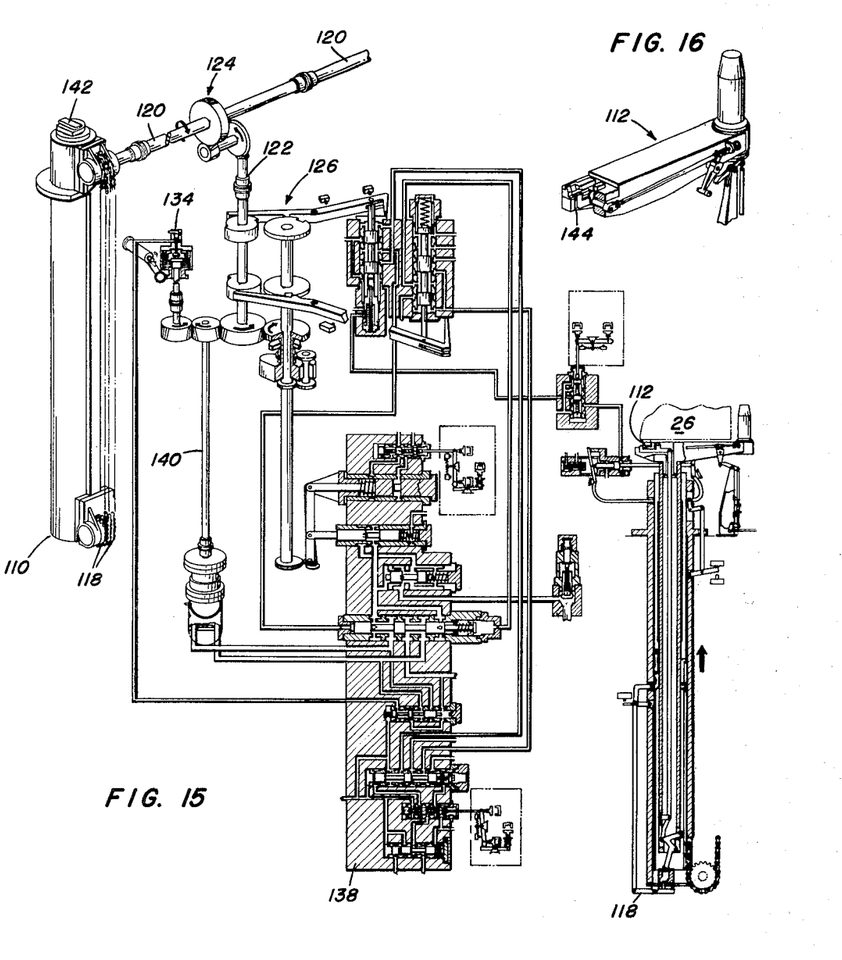
FIG. 15 is a hydraulic schematic of the hoist for the ready service ring shown in its extension cycle.
FIG. 16 is a detail depiction of the aft shoe hoist.

After the missile-booster combination 26 has been hoisted and the hoist system 28 has been lowered again, the tray 34 must be positioned to the ready service ring 20 by the energizing of the solenoid assembly 150 in the reverse direction as shown in FIGS. 14 and 14A, i.e., solenoid 153 must be actuated with moves valve 176 upward. As in the preceding cycle, the hoist system 28 must be latched in its lowered position in order to move the interlock valve 174 downwardly and permit pressure fluid from the ready service ring "latched" circuit to pass through the lower land of the solenoid valve 176 which is in its upward position to the top of the pilot valve 178, shifting it downwardly. This action ports pressure fluid through conduit 173 to the tray shift latch operating valve 166, thus moving it upwardly and unlatching the extend latch plunger 158 from the cutout 154 of the slide segment 104. The PA is then ported to the middle of valve 170 moving the upper portion in an upward direction. PA can then pass through conduit 171 to conduit 177 only, since PA to conduit 172 has been cut off by movement at valve 170. Piston 108 is thereby retracted. The pressure fluid displaced by this retraction operation of the piston 108 is then metered through the metering valve 174A, through conduit 172, the upper land of valve 170 and through conduit 179 to tank T.

Figure 12:
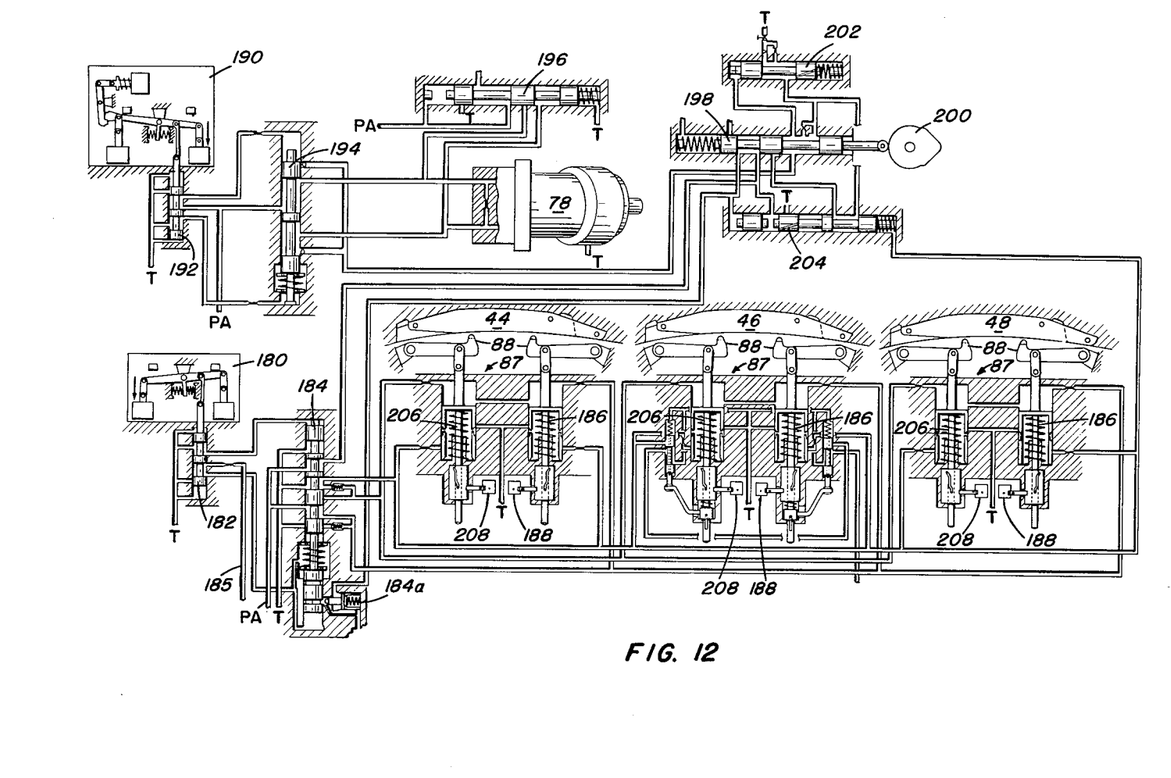
FIG. 12 is a hydraulic schematic of the ready service ring drive and control.

In order to initiate rotary movement of the ready service ring 20 the mechanism must be unlatched by energizing solenoid assembly 180, FIG. 12, which shifts solenoid valve 182 and allows PA from conduit 185 of the previously mentioned tray shift latch valve block 148 to pass to one end of pilot valve 184 while relieving the other end to tank T. Pilot valve 184 is shifted upward and PA is ported to the retract side of each right hand latch piston of the index latch unit 187. This actuates three interlock switches 188 and completes an electrical circuit which energizes solenoid assembly 190, shifting solenoid valve 192. PA then shifts pilot valve 194. Accumulator pressure PA shifts valve 196 wherever it is available, which ports pressure to release the power-off brake wherever the accumulator for the magazine power drive is pressurized and also shunts discharge of fluid from the B-end unit 78 to the flow control valve 198. The power-off brake and the B-end unit are two components of the gear reduction assembly 76 previously described in connection with FIG. 8. Unlatching of the mechanism is accomplished by energizing a solenoid assembly 180 as shown best in FIG. 12. This energization of the solenoid assembly 180 shifts a solenoid valve 182 and allows pressure PA from the previously mentioned tray shift latch valve block 148 to pass to one end of a pilot valve 184 while relieving the other end to tank T. Pilot valve 184 is shifted and then pressure fluid is ported to the retract side of each right hand latch piston 186 of the index latch units 87 assuming clockwise rotation facing missiles.

When these three latch pistons 186 are retracted, the corresponding right hand index notch 86 on each of the bearing assemblies 44, 46, and 48 is unlatched as shown best in FIG. 11. This actuates three interlock switches 188 and completes a series of electrical circuits. Next, a solenoid assembly 190 shifts a solenoid valve 192. This allows pressure fluid to pass to shift pilot valve 194. Pressure fluid is then ported to the B-end 78.

The discharge of fluid from the B-end unit 78 is then ported to a flow control valve 198. This flow control valve 198 also receives pressure fluid from pilot valve 184. Through the gear reduction assembly 76, the B-end 78 drives a cam 200 which moves the control valve 198.

As the cam 200 drives the valve 198 through its acceleration phase, B-end discharge fluid is ported to a metering valve 202 where it is metered to tank T, thus controlling the flow through the B-end 78. At the completion of the acceleration portion of the travel of the ready service ring, that is, two degrees of rotation of the ready service ring 20, the valve 198 continues to move for another half inch in order to operate a bypass valve 204. Left hand index latch pistons 206 are cammed out by the rotation of the ready service ring 20 and then held out hydraulically to close three interlock switches 208.

A series of electrical circuits consisting of these six switches 208, 188 and another switch (not shown) at either index station 2 or 20 (on either side of station 1) is completed and the solenoid assembly 180 is de-energized so as to remove pressure from pilot valve 184. Locking valve 184A prevents the pilot valve 184 from returning to a neutral position except during the constant speed portion of the cycle.

For multi-indexing constant speed is obtained by porting B-end discharge through bypass valve 204 during acceleration and deceleration phases of cam 200.

The tops of all latch pistons 186 and 206 are now ported to tank T but are held down by the camming face of bearing assemblies 44, 46, and 48 until the ready service ring 20 has completed one index cycle as determined by the control valve 198 and the operating cam 200. At the completion of the cycle of operation, the index latches 88 drop into index notches 86 and are prevented from retracting by ported pressure fluid against the bottoms of their latch pistons 186 and 206.

Obviously many modifications and variations of the present invention are possible in light of the above teachings. It is, therefore, to be understood that within the scope of the appended claims the invention may be practiced otherwise than as specifically described.

What is claimed is:

1. A device for storing and handling missiles comprising, a truss, a plurality of bearing assemblies encircling said truss at spaced points along its length, each of said assemblies having an inner stationary portion affixed to said truss and an outer portion rotatable about said inner portion, retaining means on said outer portion for releasably holding said missiles thereon, rotating means within said truss for simultaneously rotating said outer portions of said bearing assemblies, positioning means on said truss cooperating with said outer portion for stopping and positioning a selected one of said missiles in a given position with respect to said truss, releasing means on said truss for releasing said retaining means from said one missile, and hoist means attached to said truss for raising and lowering said one missile, said retaining means comprising, an outwardly extending ring affixed to and completely encircling said truss, a plurality of slide blocks on each of said outer portions, a tray having a plurality of slides engageable with said blocks for holding said tray against radial movement, said tray having a projection complementary to and engageable by said ring for holding said tray against axial movement, clamps on said tray for holding said missiles against axial movement, a plurality of shoe brackets on said outer portions engageable by said missiles for holding the same against radial movement, said releasing means comprising a plurality of cam brackets mounted on one of said outer portions, a cam operably connected to said clamp and responsive to contact with said cam bracket mounted on each of said trays, said ring having a movable portion, and moving means mounted on said truss for moving said movable portion and shifting said tray whereby said clamp is cammed open and said missile is disengaged from said shoe brackets.

2. The device for storing and handling missiles having shoes comprising, a truss, a plurality of bearing assemblies encircling said truss at spaced points along its length, each of said assemblies having an inner stationary portion affixed to said truss and an outer portion rotatable about said inner portion, an outwardly extending ring affixed to and completely encircling said truss, said ring having a movable portion, a plurality of slide blocks on each of said outer portions, a plurality of trays each having a plurality of slides engageable with said blocks for holding said trays against radial movement each of said trays having a projection complementary to and engageable by said ring for holding said trays against axial movement, clamps on each of said trays for holding said missiles against axial movement, a plurality of shoe brackets on said outer portions engageable by said shoes on said missiles for holding the same against radial movement, rotating means within said truss for simultaneously rotating said outer portions of said bearing assemblies, a plurality of index latches pivotally mounted on said inner portion, a plurality of index notches on the inner surface of said outer portion, said notches being complementary to and engageable with said latches, means mounted on said truss for selectively pivoting said latches into and out of contact with said notches, track means mounted on said truss, said movable portion of said ring axially slidable in said track means, moving means mounted on said truss for selectively moving said movable portion into and out of alignment with said ring, a plurality of cam brackets mounted on one of said outer portions, a cam on each of said trays engageable with and responsive to said cam bracket, said cam being operatively connected to said clamps for opening and closing the same, and hoist means mounted within said truss, said hoist means comprising a pair of telescoping columns having a head on one end of each of said columns complementary to and engageable with said shoes and pivot means for extending and retracting said telescoping columns.

References Cited by the Examiner
UNITED STATES PATENTS

| | | | |
|---|---|---|---|
| 1,800,059 | 4/1931 | Egan | 214—16.1 |
| 3,054,300 | 9/1962 | Carlberg | 89—1.7 |

BENJAMIN A. BORCHELT, *Primary Examiner.*

S. W. ENGLE, *Assistant Examiner.*